G. I. McKELWAY.
INHALERS.
No. 183,694. Patented Oct. 24, 1876.
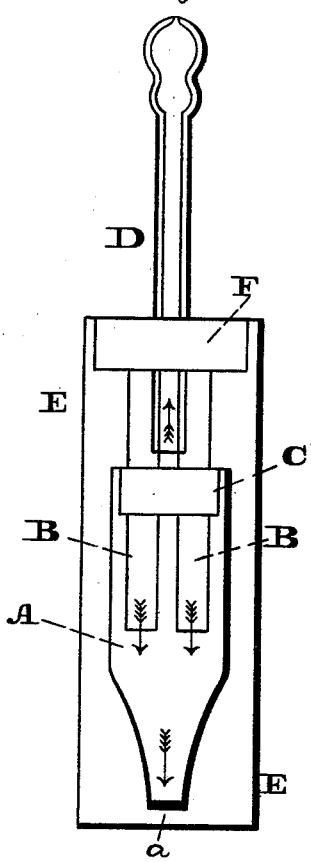
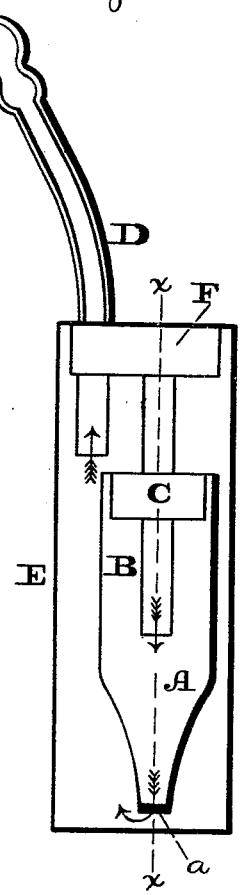
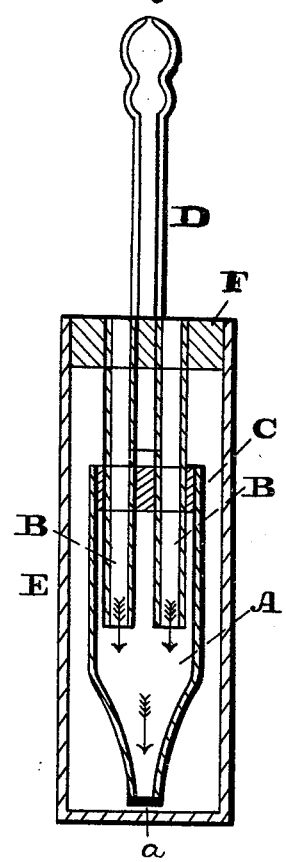
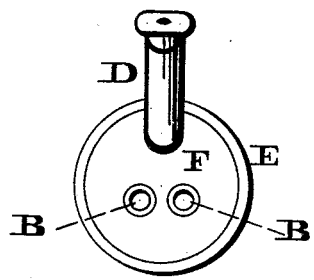

UNITED STATES PATENT OFFICE.

GEORGE I. McKELWAY, OF PHILADELPHIA, PENNSYLVANIA.

IMPROVEMENT IN INHALERS.

Specification forming part of Letters Patent No. 183,694, dated October 24, 1876; application filed June 14, 1876.

*To all whom it may concern:*

Be it known that I, GEORGE I. McKELWAY, of the city and county of Philadelphia and State of Pennsylvania, have invented a new and useful Improvement in Inhaling Apparatus; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figures 1 and 2 are side views of the device embodying my invention. Fig. 3 is a transverse vertical section thereof in line $x\ x$, Fig. 2. Fig. 4 is a top view thereof.

Similar letters of reference indicate corresponding parts in the several figures.

My invention consists of a vessel within which are suspended tubes for the reception of the materials from which the volatile matter is generated, and an inclosing-vessel for the reception of water or other fluid for washing and purifying the volatile matters, or impregnating the same, the upper or outer ends of the tubes communicating with the atmosphere, but not with the surrounding wash or fluid vessel.

Referring to the drawings, A represents a vessel within which are suspended tubes B B, which may be of cylindrical, conical, or other form, and they are open at top and bottom. The vessel A will be closed at top by a stopper, C, which surrounds and supports the tubes B, and it has an orifice or outlet, as at $a$.

The operation is as follows: Suppose it is required to inhale muriate of ammonia, I place in one of the tubes B a quantity of muriatic acid; in the other aqua ammonia; and a suitable amount of pumice-stone, as an absorbent, in both.

E represents a vessel or bottle which surrounds the vessel A, and forms a receptacle for water or other fluid, whereby, as the volatile matters from the vessel A leave the orifice or outlet $a$, they pass through the fluid, which may be of a nature to wash or purify the volatile matters, or impregnate them. D represents the inhaling-tube, which communicates with the vessel E, and passes through a stopper, F, which closes the top of the vessel E, and, in order that access may be had to the tubes B of the vessel A, said tubes will be made sufficiently long, so that their upper ends will pass through and be held by the stopper F.

The course of the volatile matters from the vessel A into the vessel E, and thence to the tube D, is readily indicated by the arrows, Fig. 2.

The volatile matters of the muriatic acid and ammonia will unite in the vessel A, which thus acts as a generator, so that the union will occur prior to washing. Should there be an excess of either the muriatic acid or ammonia, the fluid in the outer vessel will absorb it.

Having thus described my invention, what I claim as new, and desire to secure by Letters Patent, is—

The vessel A, with outlet $a$, and suspended tubes B, in combination with the surrounding vessel E and inhaling-tube or mouth-piece D, the upper or outer ends of said tubes B communicating with the atmosphere, but not with the vessel E, substantially as and for the purpose set forth.

GEORGE I. McKELWAY.

Witnesses:
JOHN A. WIEDERSHEIM,
H. E. HINDMARSH.